Dec. 1, 1925.
J. PLUTO
TIRE VALVE
Filed May 15, 1925
1,564,108
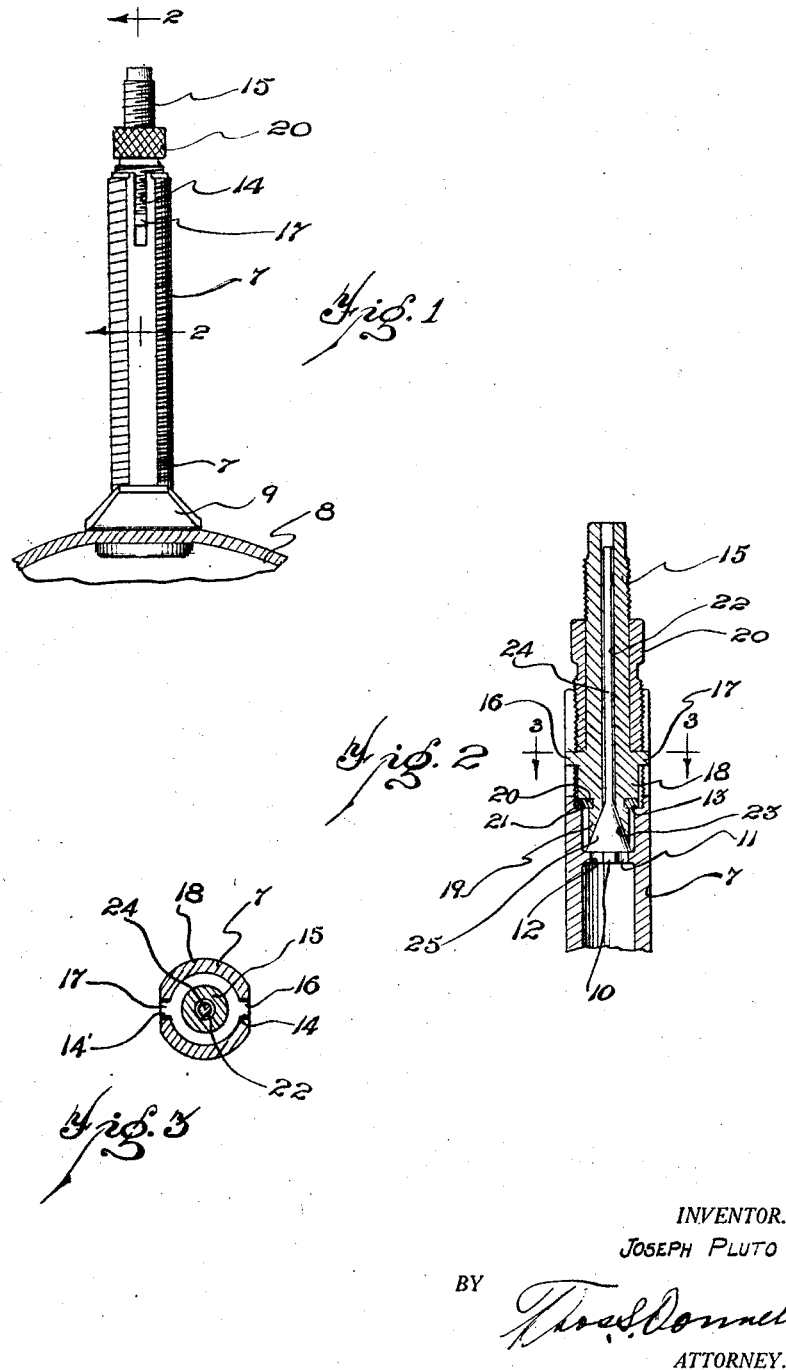
INVENTOR.
JOSEPH PLUTO
BY Thos. S. Donnelly
ATTORNEY.

Patented Dec. 1, 1925.

1,564,108

UNITED STATES PATENT OFFICE.

JOSEPH PLUTO, OF PONTIAC, MICHIGAN.

TIRE VALVE.

Application filed May 15, 1925. Serial No. 30,634.

*To all whom it may concern:*

Be it known that I, JOSEPH PLUTO, a citizen of the United States, residing at Pontiac, in the county of Oakland and State of Michigan, have invented a new and useful Improvement in a Tire Valve, of which the following is a specification.

My invention relates to a new and useful improvement in a tire valve and has for its object, the provision of a tire valve, adapted for mounting on a pneumatic tire, or the like, and so arranged and constructed as to provide an effective sealing means for preventing the escape of air under pressure from said tire through the valve stem.

Another object of the invention is the provision of a tire valve, in which a positive means for seating the valve on its seat is provided, so as to assure an effective sealing, to prevent the escape of air from the tire through the valve stem.

Other objects of the invention will be apparent from the description of the construction, arrangement and operation of the various parts comprising the invention.

The invention consists in the combinations and arrangements of parts hereinafter described and claimed.

The invention will be best understood from a reference to the accompanying drawings, which form a part of this specification and in which, Fig. 1 is a side elevational view of the invention, showing it applied to a tire, the tire being shown in fragment, Fig. 2 is a sectional view, taken on substantially line 2—2 of Fig. 1, Fig. 3 is a sectional view taken on substantially line 3—3 of Fig. 2.

The invention is shown applied to a tire 8, although, from the description, it will be apparent that the invention may be applied to other objects in which a quantity of air is inserted under pressure.

In this connection, the invention, while being termed a "tire valve" may be understood to relate to the class of valves to which the present invention applies and covers the use of the invention in its various uses to which it may be applied.

As shown in the drawings, the invention is used with a valve stem 7, which is mounted upon a tire tubing 8, the stem 7 being provided with a suitable attaching seat 9. The construction of the attachment means for securing the valve stem to the tire forms no part of the present invention, and therefore, is not described in detail. Provided in the valve stem 7 is a partition wall 10 having openings 11 and 12 formed therein.

As shown in Fig. 2, the upper portion of the valve stem 7 is slightly enlarged to provide a shoulder 13. Extending upwardly from adjacent the shoulder 13 at diametrically opposite sides of the valve stem 7 are formed longitudinally extending slots 14 and 14'. Slidably positioned in the upper portion of the valve stem 7 is a stem 15 having trunnions 16 and 17 projecting outwardly therefrom at diametrically opposite points, adapted for engagement in the slots 14 and 14', the ends of the trunnions 16 and 17 terminating, so as to lie flush with the periphery of the valve stem 7. The lower portion of the stem 15 is enlarged as at 18, the portion 18 terminating in a reduced portion 19 having a peripheral groove 20 formed therein, in which engages a ring 21, positioned thereon in embracing relation. This ring 21 is preferably made from rubber or other material which will serve to act as a gasket, when engaging the shoulder 13. The lower end of the reduced portion 19 is provided with the flared opening 23, to provide a conical valve seat, adapted to co-operate with the conical head 25, which is carried by the stem 24, positioned in the bore 22 of the stem 15. The upper portion of the valve stem 7 is interiorly threaded, as shown in Fig. 2, and adapted to receive an exteriorly threaded locking sleeve 26.

The construction is such that when the head 25 is placed in engagement with the partition 10 and the stem 15 inserted in the position shown in Fig. 2, a threading of the sleeve 26 into the stem 7 will serve to move the gasket 21 into close engagement with the shoulder 13, so as to effect a secure sealing of the valve stem 7 at this point. As the sleeve 26 is threaded into the stem 7, it engages at its inner end the trunnions 16 and 17, so as to press the gasket between the shoulder 13 and the enlarged portion 18 of the stem 15. At the same time, the head 25 is pressed securely into its seat 23, so as to securely seal the stem at this point and prevent the escape of air through the bore 22 in the stem 15. The head 25 is preferably made from rubber, although any other desired material, such as cork, or the like, may be used.

When it is desired to inflate the tire, the sleeve 26 may be unscrewed a couple of turns and the air forced through the bore 22 will then move the head 25 from the seat 23, so as to permit the entry of air into the valve stem 7, through the openings 11 and 12. When the air is being forced through the bore 22, the head will be spaced from its seat 23, and also spaced slightly from the partition 10. After the tire has been properly inflated, a couple of turns of the locking sleeve 26 will force the head 25 into the seat 23 and serve to seal tightly the joint at the shoulder 13, thus effecting a secure and positive sealing of the valve stem, so that leakage of the air through the valve stem is prevented.

If desired, the head 25 may be moved into the seat 23 solely by the pressure of the air in the valve stem 7, although it is believed more efficient in forcing it positively into its seat 23, as is shown in Fig. 2.

The construction is a simple one with a minimum number of parts, and so arranged that these parts may be quickly and easily changed. The ring 21 is readily removable from its position in the groove 20, so that it may be easily and quickly replaced with a new gasket, when it becomes worn. The head and stem 24 may also be replaced when the head 25 becomes worn, so that a minimum number of parts will be replaced through wear of the valve.

The construction shown is an efficient one of the purpose and serves to prevent any leakage through the valve stem, thus overcoming difficulties of valve stems as now on the market.

While I have illustrated and described the preferred form of structure, I do not wish to limit myself to the precise form of structure shown, but desire to avail myself of such variations and modifications as come within the scope of the appended claims.

What I claim is:

1. A valve of the class described, comprising a stem; an interior abutment mounted in said stem; a valve head adapted for engagement with said abutment; a valve seat bearing member, adapted for loose positioning in said stem; and means for moving said valve seat bearing member relatively to said valve head for forcing said valve head while in engagement with said abutment into close engagement with said seat; and means for sealing the interior of the lower portion of said valve stem from the exterior of said valve seat bearing member substantially simultaneously with the close engagement of said head with said seat.

2. A valve of the class described, comprising a valve stem; an abutment member mounted in said stem; a conically shaped valve head adapted for engagement with said abutment member; a conically shaped valve seat bearing member adapted for loose positioning in said stem, said valve seat being adapted for the reception of said valve head; a gasket mounted on said valve seat bearing member; a shoulder formed on the inner surface of said valve stem, adapted for engaging said gasket; trunnions projecting outwardly from said valve seat bearing member, and adapted for engagement in longitudinally extending slots formed in said valve stem; and a sleeve adapted for threading into the upper end of said valve stem and for engaging at its inner end said trunnions, and adapted, upon further threading into said valve stem, for clamping said gasket against said shoulder and forcing said valve head into close engagement with said seat.

3. A valve of the class described, comprising a valve stem; an abutment member mounted in said stem; a conically shaped valve head adapted for engagement with said abutment member; a guide rod projecting outwardly from the apex of said valve head; a seat-bearing member loosely positioned in said stem and having a conically shaped valve seat at its inner end adapted for the reception of said head and provided with a bore for the reception of said guide rod; a gasket mounted on said seat bearing member; a shoulder formed on the inner surface of said valve stem for engaging said gasket; a pair of trunnions projecting outwardly diametrically opposite each other from said seat bearing member and engaging in longitudinally extending slots formed in said valve stem; and a sleeve adapted for threading into the upper end of said valve stem and engaging at its inner end said trunnions and adapted upon threading into said valve stem sufficiently for clamping said gasket against said shoulder and for forcing said seat bearing member inwardly for forcing said valve head into close engagement with said seat.

In testimony whereof, I have signed the foregoing specification.

JOSEPH PLUTO.